(12) United States Patent
Zaremba

(10) Patent No.: US 12,313,254 B2
(45) Date of Patent: May 27, 2025

(54) LENS PLATE

(71) Applicant: SIGNIFY HOLDING B.V., Eindhoven (NL)

(72) Inventor: Krzysztof Cezary Zaremba, Bialystok (PL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/009,409

(22) PCT Filed: Jun. 8, 2021

(86) PCT No.: PCT/EP2021/065236
§ 371 (c)(1),
(2) Date: Dec. 9, 2022

(87) PCT Pub. No.: WO2021/249979
PCT Pub. Date: Dec. 16, 2021

(65) Prior Publication Data
US 2023/0258313 A1      Aug. 17, 2023

(30) Foreign Application Priority Data
Jun. 11, 2020   (EP) ..................... 20179495

(51) Int. Cl.
F21V 5/00      (2018.01)
F21V 5/04      (2006.01)
F21Y 115/10    (2016.01)

(52) U.S. Cl.
CPC ............. *F21V 5/007* (2013.01); *F21V 5/048* (2013.01); *F21Y 2115/10* (2016.08)

(58) Field of Classification Search
CPC ....... F21V 5/007; F21V 5/048; G02B 3/0056; F21S 4/22
See application file for complete search history.

(56) References Cited

U.S. PATENT DOCUMENTS

| | | | | |
|---|---|---|---|---|
| 4,439,818 A | * | 3/1984 | Scheib | H05K 1/189 40/550 |
| 5,931,577 A | * | 8/1999 | Ishibashi | H05K 1/189 362/249.14 |
| 9,939,125 B2 | * | 4/2018 | Donato | F21V 5/007 |
| 10,269,890 B2 | * | 4/2019 | Cho | H01L 23/5283 |

(Continued)

FOREIGN PATENT DOCUMENTS

| | | |
|---|---|---|
| JP | 2007199495 A | 8/2007 |
| WO | 2020052235 A1 | 3/2020 |

OTHER PUBLICATIONS

AspectLED, "B-Series (Bendable) Zig-Zag Flexible LED Strip Light—Standard Bright (18 LEDs/foot)", Jun. 11, 2019, established by waybackmachine, https://www.aspectled.com/flexible-led-strip-lights/single-color-led-strips/b-series-bendable-zig-zag-flexible-led-strip-light-standard-bright-18-leds-foot (Year: 2019).*

*Primary Examiner* — Matthew J. Peerce

(57) ABSTRACT

The present invention relates to a lens plate (10) for an LED device (100), comprising: a plurality of lens elements (12a-e); and a flexible connection (24a-d) between two lens elements of the plurality of lens elements so that at least one of a distance ($P_{11}$) and an angle between the two lens elements can be adjusted, wherein the two lens elements and the flexible connection are made of the same material.

9 Claims, 6 Drawing Sheets

(56) References Cited

U.S. PATENT DOCUMENTS

| | | |
|---|---|---|
| 10,381,333 B2 | 8/2019 | Zhang et al. |
| 2005/0158421 A1 | 7/2005 | Zoppas |
| 2012/0189800 A1 | 7/2012 | Fujiwara et al. |
| 2015/0034978 A1 | 2/2015 | Hussell |
| 2016/0211471 A1 | 7/2016 | Kwon et al. |
| 2018/0358525 A1 | 12/2018 | Bierhuizen et al. |
| 2020/0011521 A1 | 1/2020 | Joiris |

* cited by examiner

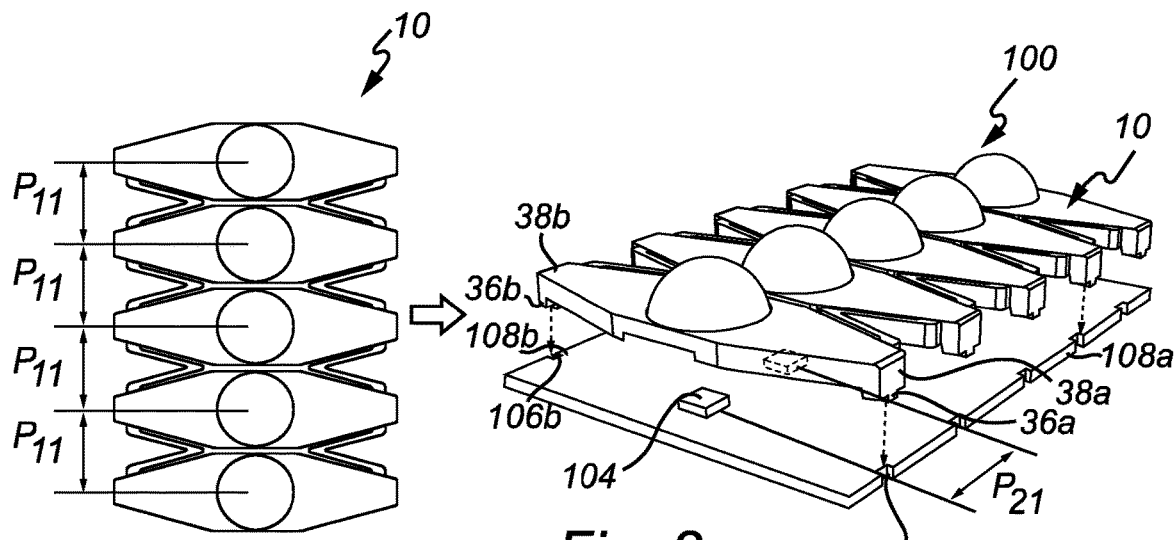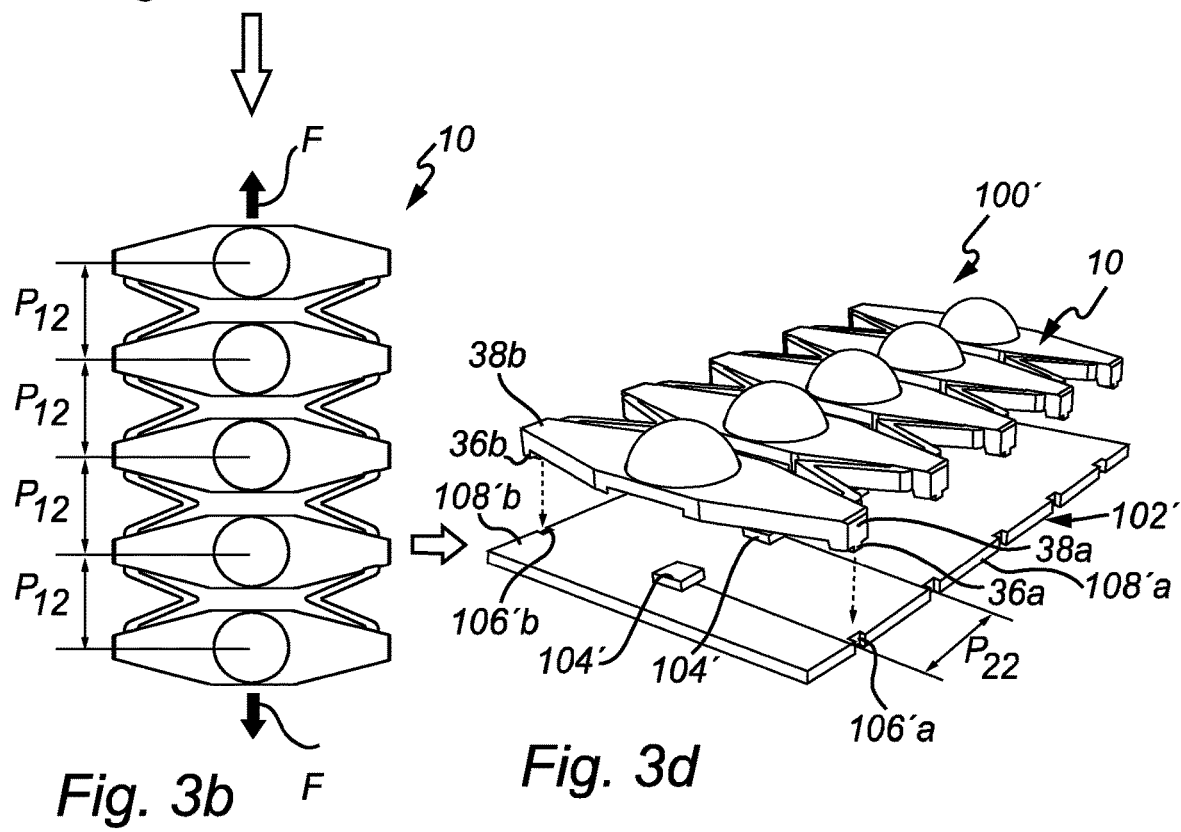
Fig. 3a  Fig. 3b  Fig. 3c  Fig. 3d

LENS PLATE

CROSS-REFERENCE TO PRIOR APPLICATIONS

This application is the U.S. National Phase application under 35 U.S.C. § 371 of International Application No. PCT/EP2021/065236, filed on Jun. 8, 2021, which claims the benefit of European Patent application Ser. No. 20/179,495.5, filed on Jun. 11, 2020. These applications are hereby incorporated by reference herein.

FIELD OF THE INVENTION

The present invention relates to a lens plate for an LED (light emitting diode) device. The present invention also relates to an LED device comprising such a lens plate, use of such a lens plate, and a method of manufacturing such a lens plate.

BACKGROUND OF THE INVENTION

A lens plate with a plurality of lens elements may be used over an LED board (i.e. a board or carrier with light emitting diodes mounted thereon) in various LED devices to influence the light distribution of the light emitting diodes. However, each change in LED pitch (distance between LEDs) on an LED board requires investment into a new manufacturing tool, even if one wants to keep light distribution (the shape of the lenses of the lens plate) the same. For example, if one changes the LED pitch only by 0.05 mm in a 2 ft LED device with 48 light emitting diodes, the position of the last light emitting diode changes by 0.05× 47=2.35 mm, which is critical from an optical point of view.

US2012189800 discloses an element array in which an error in pitch among elements in the element array is absorbed surely in a step of laminating a plurality of element arrays so that each group of the elements arrayed in the laminating direction can be aligned with high accuracy. The element array has a plurality of lenses arrayed one-dimensionally or two-dimensionally, and a flexible support formed out of a material richer in elasticity than a material forming the lenses. The lenses are coupled with one another through the support. The lenses and the support are formed integrally by double molding.

SUMMARY OF THE INVENTION

It is an object of the present invention to overcome or at least alleviate the above-mentioned problems, and to provide an improved lens plate.

According to a first aspect of the invention, this and other objects are achieved by a lens plate for an LED device, the lens plate comprising: a plurality of lens elements; and a flexible connection between a further plurality of two consecutive lens elements of the plurality of lens elements so that at least one of a distance and an angle between each of said two lens elements can be adjusted, wherein each of said two lens elements and the flexible connection are made of the same material.

The present invention is based on the understanding that flexible connections between lens elements allows a lens plate of one type to suit LED boards with different LED pitches and/or even different shapes, by stretching (or possibly squeezing) these connections. Hence, the present lens plate is versatility applicable, which saves cost when manufacturing many different types of LED devices/boards. Furthermore, since the lens elements and the flexible connections of the lens plate are made of the same material, the construction of the adjustable lens plate is simplified, and manufacturing may be facilitated.

The flexible connection may for example be molded together with the two lens elements, e.g. by injection molding.

The flexibility of the flexible connection may be achieved by at least one of the shape, dimension, and position of the flexible connection, rather than selecting a different material (e.g. richer in elasticity) for the flexible connection compared to the lens elements.

The flexible connection may comprise two (parallel) spring members.

The flexible connection may for example comprises two V-shaped members. V-shaped members are advantageous in that they could be both stretched and squeezed. Also, the V-shaped members need not overlap, which enables easy molding. The V-shaped members preferably lie in a plane which is perpendicular to the plurality of lens elements' optical axes, because then they may not cover a lens (portion) of the lens element or a beam of light emitted from the lens (portion). They also need less material.

Other shapes of the flexible connections are possible, for example W- or U- or Π-shapes. Other orientations/positions of the flexible connections are (also) possible, like standing in a plane which is parallel to the plurality of lens elements' optical axes.

Furthermore, the two lens elements may each have a base portion, wherein the two base portions at least partly define two triangular- or isosceles trapezoid-shaped spaces pointing towards each other between the two base portions, and wherein each of the two triangular- or isosceles trapezoid-shaped spaces accommodates one of the two V-shaped (or W-shaped) members of the flexible connection. An advantage of this is that a relatively short minimum distance between the (two) lens elements can be realized despite the flexible connection between them. To achieve the two triangular- or isosceles trapezoid-shaped spaces, the base portions could be hexagonal or octagonal, for example.

A gap may exist between the two lens elements when no force is applied to the flexible connection. In this way, the lens element pitch may be both increased or decreased, whereby the lens plate may fit a great variety of LED boards. The gap may for example be present between a side of the aforementioned hexagonal or octagonal base portion of one of the two lens elements and an opposing side of a hexagonal or octagonal base portion of the other lens element. In another embodiment, there is (substantially) no gap between the two lens elements when no force is applied to the flexible connection.

In one embodiment, each lens element of the plurality of lens elements includes two protrusions adapted to engage with corresponding notches in an LED board of the LED device for positioning of the lens plate on the LED board. Such positioning is solving the issue with influence of thermal elongation on light distribution as positions of the lens elements relative to light emitting diodes of the LED board are stable. In another embodiment, each lens element includes two notches adapted to engage with corresponding protrusions on the LED board. Also combinations of these two embodiments are possible. An additional element, e.g. a frame, could also be used for positioning.

The plurality of lens elements may be arranged in a linear array. The array may be a rectilinear (straight) array. In another embodiment, the linear array is curved in a plane perpendicular to the plurality of lens elements' optical axes.

According to a second aspect of the invention, there is provided an LED device, comprising: a board with a plurality LED light sources; and a lens plate according to the first aspect, wherein a pitch of the plurality of lens elements of the lens plate match a pitch of the plurality of LED light sources of the board.

Each lens element of the plurality of lens elements may include two protrusions engaging with corresponding notches in the board for positioning of the lens plate on the board.

A third aspect of the invention pertains the use of a lens plate according to the first aspect with any one of at least two LED boards with different LED pitches and/or different shapes.

According to a fourth aspect of the invention, there is provided a method of manufacturing an LED device, which method comprises: providing a lens plate according to the first aspect; providing a board with a plurality of LED light sources; if needed, stretching and/or compressing the flexible connection(s) by applying a force such that a pitch of the plurality of lens elements of the lens plate matches a pitch of the plurality of LED light sources of the board; and positioning the lens plate on a board.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

FIGS. 1 and 3a are top views of a lens plate according to an embodiment of the present invention when no force is applied to its flexible connections.

FIG. 3b is a top view of the lens plate of FIG. 3a, with its flexible connections stretched.

FIG. 3c is an exploded perspective view of an LED device comprising the lens plate of FIG. 3a positioned on an LED board.

FIG. 3d is an exploded perspective view of an LED device comprising the lens plate of FIG. 3b positioned on another LED board.

Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
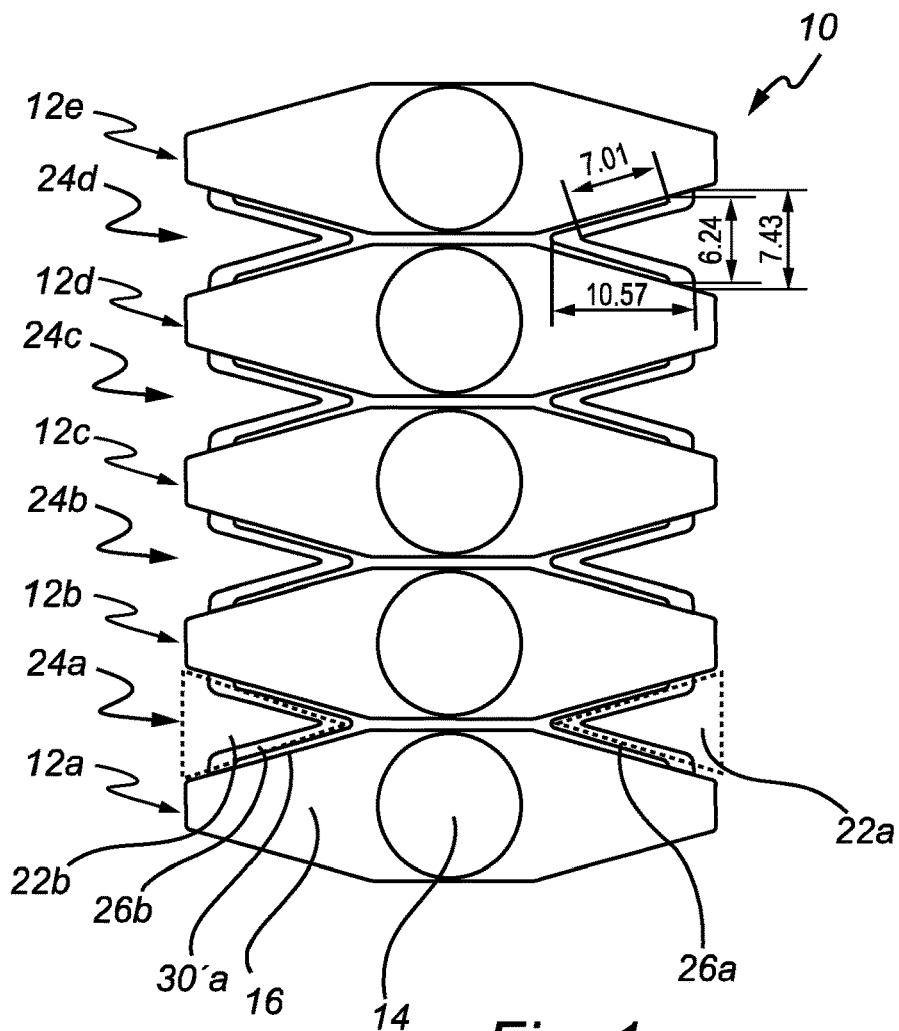
Figure 1:
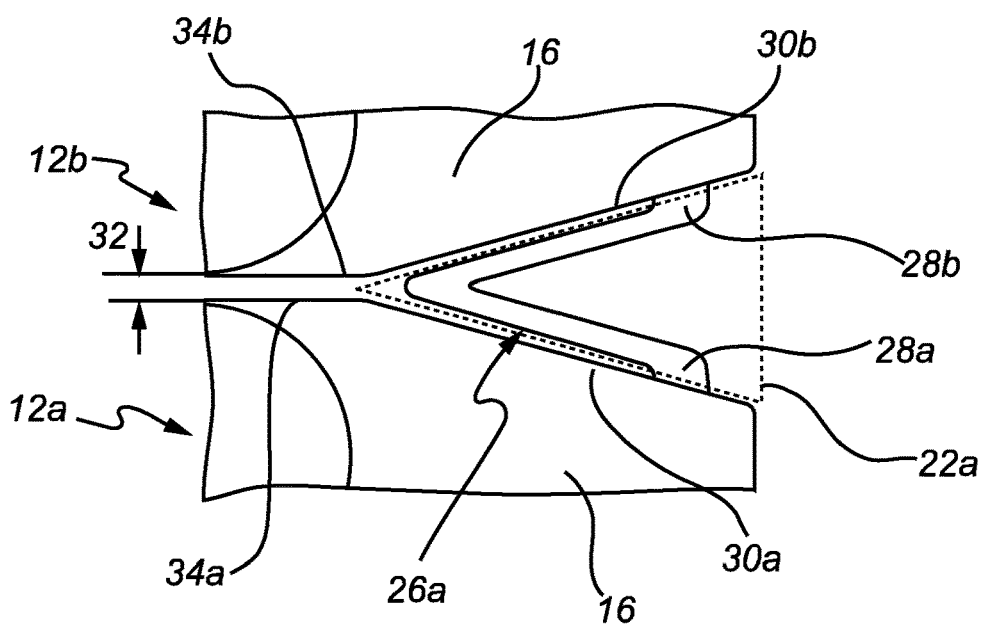
Figure 2:
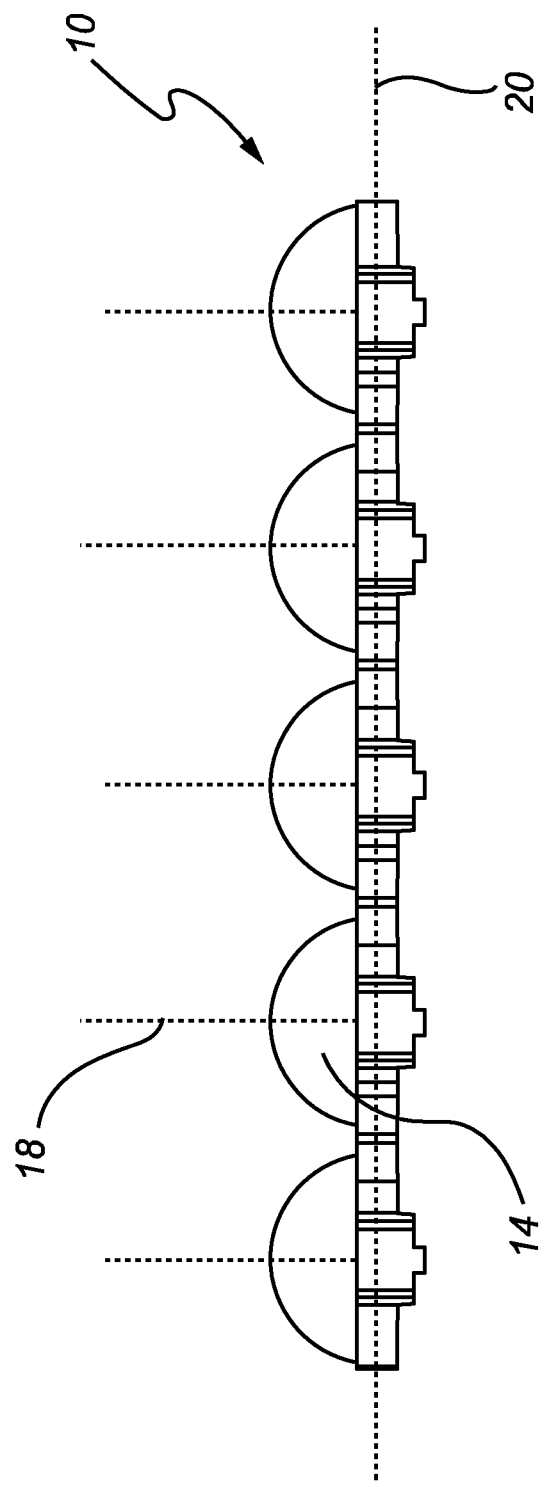
FIG. 2 is a side view of the lens plate of FIG. 1.

FIGS. 1 and 2 (and 3a) show a lens plate 10 according to an embodiment of the present invention.

The lens plate 10 comprises a plurality of lens elements 12a-e. The (plurality of) lens elements 12a-e may be (substantially) rigid. The (plurality of) lens elements 12a-e are here arranged in a rectilinear array. Each lens element 12a-e comprises a lens portion 14 and a base portion 16. The lens portion 14 may for example be dome-shaped, but other shapes are possible. Each lens portion 14 has an optical axis 18. For a non-imaging lens portion, the optical axis 18 may be construed as a line which coincides with the axis of an associated light emitting diode (see e.g. LED light sources 104 discussed hereinbelow), i.e. the axis of the light emitting diode the lens portion was designed for. The base portions 16 are here octagonal, in a plane 20 perpendicular to the optical axes 18. Each two adjacent base portions 16, for example the base portions of lens elements 12a and 12b, may at least partly define two triangular- or isosceles trapezoid-shaped spaces 22a-b pointing towards each other between the two base portions 16.

The lens plate 10 further comprises a flexible connection 24a-d between each two consecutive lens elements 12a-e, for example flexible connection 24a between lens elements 12a-b, flexible connection 24b between lens elements 12b-c, and so on. The number of lens elements of the lens plate 10 may be N, and the number of flexible connections of the lens plate 10 may be N-1, wherein N is an integer, for example in the range 2-200. An exemplary approx. 2 ft lens plate could for example have 48 lens elements and 47 flexible connections. Another exemplary approx. 1 ft lens plate could for example have 24 lens elements and 23 flexible connections. Each flexible connection 24a-d allows at least one of a distance and an angle between its two lens elements 12a-e to be adjusted, as will be further described hereinbelow.

The lens elements 12a-e and the flexible connections 24a-d are made of the same material. That is, the lens plate 10 can be made from one material. The lens elements 12a-e and the flexible connections 24a-d can be made of a none elastic material. The lens elements 12a-e and the flexible connections 24a-d may for example be made of PC (polycarbonate) (which is a none elastic material). Alternatively, the lens elements 12a-e and the flexible connections 24a-d could be made of silicone. The flexible connections 24a-d may for example be molded together with the lens elements 12a-e. Thus, the lens elements 12a-e and the flexible connections 24a-d of the lens plate 10 can be made in one piece. Furthermore, the lens elements 12a-e and the flexible connections 24a-d can be made in one manufacturing process, e.g. injection molding or injection of liquid silicone (LSR).

Each flexible connection 24a-d may comprise two V-shaped members 26a-b. The V-shaped members 26a-b lie in the plane 20. The V-shaped members 26a-b (generally) point towards each other. As may be seen in particular in the magnified portion of FIG. 1, one end 28a of each V-shaped member 26a-b is connected to one lens element 12a, and the other end 28b of each V-shaped member 26a-b is connected to an adjacent lens element 12b. Specifically, the V-shaped members 26a-b may be accommodated in the aforementioned triangular- or isosceles trapezoid-shaped spaces 22a-b, wherein said end 28a is connected to a side 30a of the base portion 16 of lens element 12a, which side 30a partly define the space 22a, and wherein end 28b is connected to a side 30b of the base portion 16 of lens element 12b, which side 30b also partly define the space 22a. Exemplary dimensions (in mm) of the V-shaped member are shown in FIG. 1.

Figure 4A:
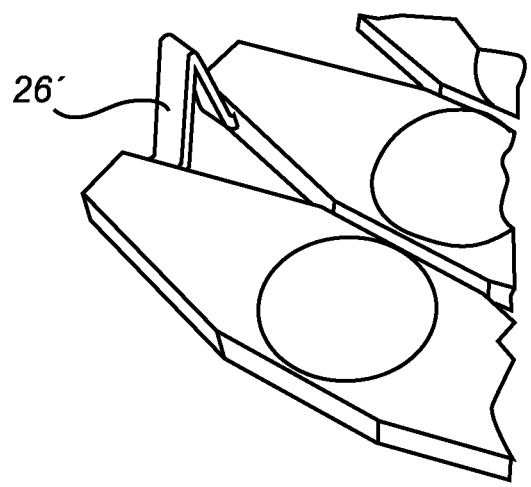
FIGS. 4a-d show alternative flexible connections.
Figure 4B:
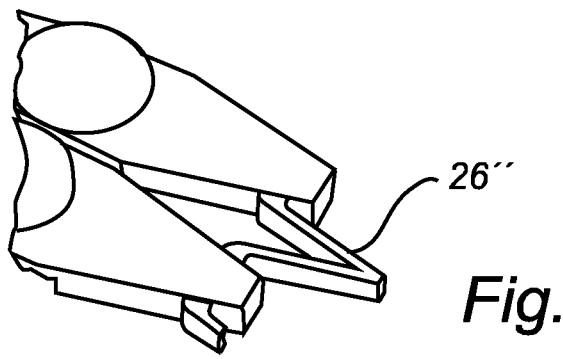
Figure 4C:
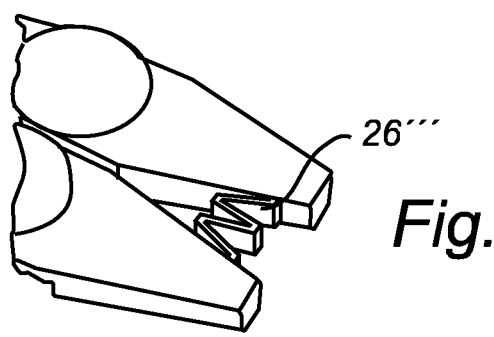
Figure 4D:
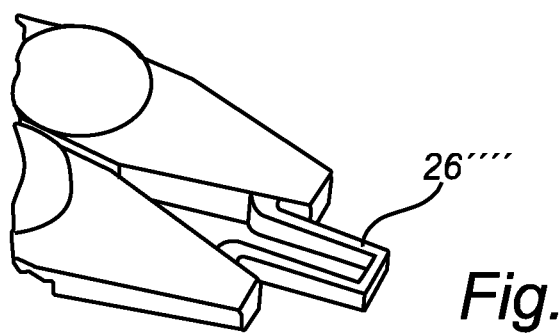

Various alternative flexible connections are shown in FIGS. 4a-d. In FIG. 4a, the flexible connection comprises a V-shaped member 26' which stands in a plane perpendicular to the plane 20. In FIG. 4b, the flexible connection comprises a V-shaped member 26" which lies in the plane 20 but points away from the opposing flexible connection member. Compared to FIG. 1, V-shaped members 26" could be made longer and hence more flexible. In FIG. 4c, the flexible connection comprises a W-shaped member 26''' which may lie in the plane 20. In FIG. 4d, the flexible connection comprises a Π-shaped member 26"" ("three sided rectangle") which may lie in the plane 20 and point away from the opposing flexible connection member.

Returning to FIG. 1, a gap 32 may exist between each two consecutive lens elements, like lens elements 12a-b, when no force is applied to the flexible connections 24a-d. Specifically, the gap 32 may be present between a side 34a of the octagonal base portion 16 of one lens element 12a and an opposing (and here parallel) side 34b of the octagonal base portion 16 of an adjacent lens element 12b. Notably, side 34a sits between side 30a partly defining space 22a and the corresponding side 30'a partly defining space 22b.

As mentioned above, each flexible connection 24a-d allows a distance between its two lens elements 12a-e to be adjusted. Specifically, by stretching the flexible connections 24a-d (by applying an external force F), the distance between the lens elements 12a-e may be increased, as shown in FIG. 3b. Namely, a pitch of the lens elements 12a-e may be increased up to e.g. 40%, for example from $P_{11}=12$ mm to $P_{12}=14$ mm. It is noted that the distance (pitch) between the lens elements is adjusted in the plane 20, here along the rectilinear direction of the aforementioned rectilinear array.

The lens plate 10 in the state shown in FIG. 3a may be positioned on a board 102 with a plurality of LED light sources 104 having a pitch $P_{21}$ equal to $P_{11}$, as shown in FIG. 3c, wherein the lens plate 10 and the board 102 with the LED light sources 104 form part of an LED device 100. However, a/the lens plate 10 in the state shown in FIG. 3b could likewise be position on another board 102' with a different (greater) LED pitch $P_{22}$ equal to $P_{12}$, as shown in FIG. 3d, wherein the lens plate 10 and the board 102' with LED light sources 104' form part of an LED device 100'. Hence, the lens plate 10 can suit LED boards 102, 102' with different LED pitches $P_{21}$ and $P_{22}$, making the present lens plate 10 versatilely applicable.

The board 102 (102') could be a printed circuit board. The board 102 (102') could be rectangular. The plurality of LED light sources 104 (104') could be mounted on a surface of the board 102 (102'). The plurality of LED light sources 104 (104') could be arranged in a rectilinear array. The number of LED light sources 104 (104') could be N. The LED device 100 (100') may be or form part of a luminaire.

Furthermore, each lens element 12a-e of the lens plate 10 may include two protrusions 36a-b adapted to engage with corresponding notches 106a-b (106'a-b) in the board 102 (102') for positioning of the lens plate 10 on the board 102 (102'). Specifically, one protrusion 36a may be located at a lateral side 38a of the octagonal base portion 16, and the other protrusion 36b may be located at the opposite lateral side 38b. The corresponding notches 106a-b (106'a-b) may be located at longitudinal edges 108a-b (108'a-b) of the board 102 (102'). Such positioning is solving the issue with influence of thermal elongation on light distribution as positions of the lens elements 16 relative to LED light sources 104 (104') of the board 102 (102') are stable.

Figure 5:
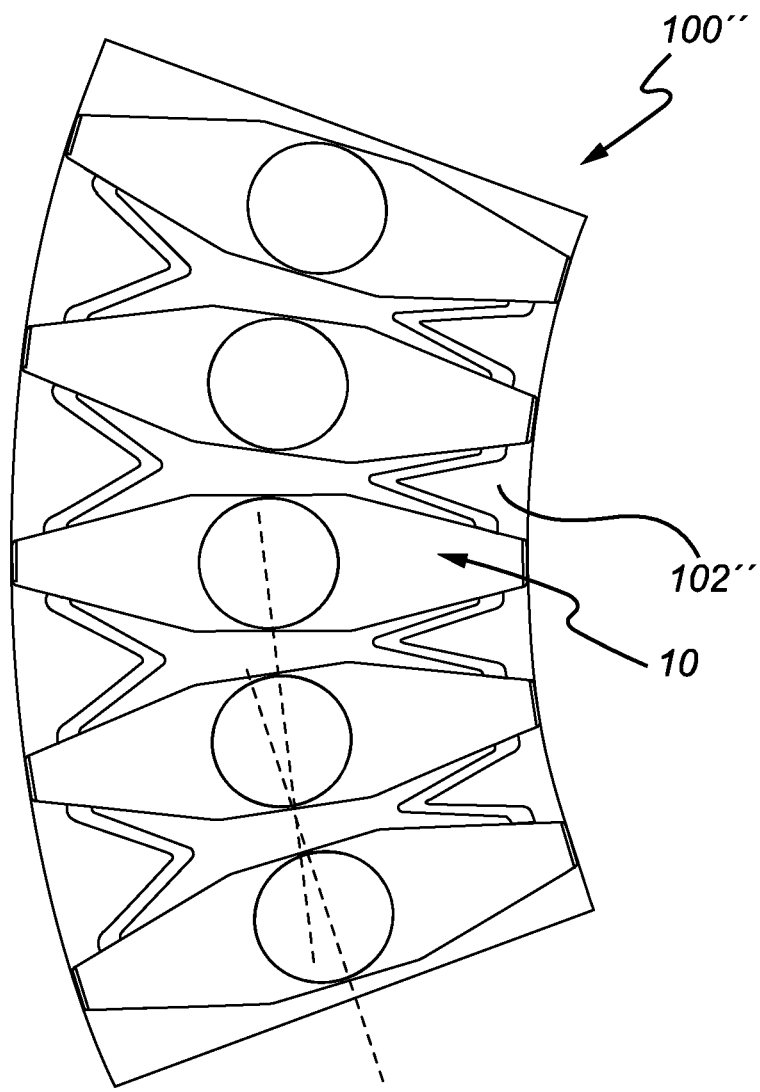
FIG. 5 is a top view of the lens plate of FIG. 1 in a curved configuration.

Turning to FIG. 5, the lens plate 10 could also be positioned on a curved board 102". Here, the linear array of lens elements 16 is curved (in plane 20). This may be achieved by applying an external force such that only (or mostly) the V-shaped members 26b at one side of the lens plate 10 are stretched, while the V-shaped members 26a at the other side of the lens plate 10 may be (slightly) squeezed, compared to the state shown in FIGS. 1 and 3a. As shown in FIG. 5, the angle between each two consecutive lens elements has been adjusted (over FIG. 1), as appreciated by the non-aligned dashed lines.

Figure 6:
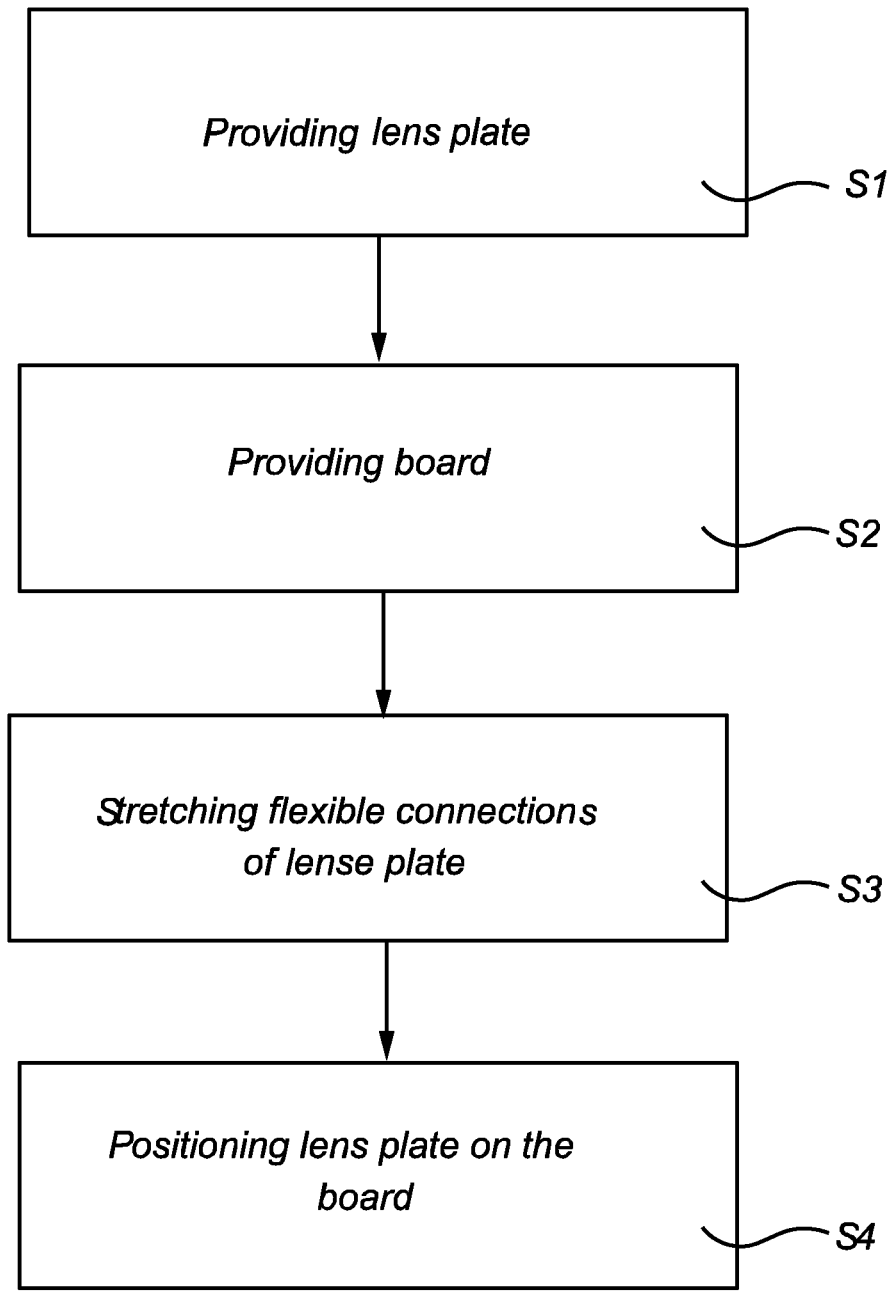
FIG. 6 is a flow chart of a method according to an embodiment of the present invention.

FIG. 6 is a flow chart of a method of manufacturing an LED device 100, 100' according to an embodiment of the present invention.

At S1, the method comprises providing the lens plate 10, e.g. as shown in FIGS. 1 and 3a.

At S2, the board 102, 102' with the plurality of LED light sources 104 (104') is provided.

At S3, the method comprises—if needed—stretching and/or compressing the flexible connections 24a-d by applying a force F such that the pitch $P_{12}$ of the plurality of lens elements 12a-e of the lens plate matches the pitch $P_{22}$ of the plurality of LED light sources 104'. Here it is noted that step S3 needs not to be performed if the lens plate 10 as shown in FIGS. 1 and 3a is to be positioned on the board 102, but is indeed performed (stretching the flexible connections 24a-d) if that lens plate 10 is to be positioned on the board 102'.

At S4, the lens plate 10 is positioned on the board 102 (102'), e.g. using the aforementioned protrusions/notches.

The person skilled in the art realizes that the present invention by no means is limited to the preferred embodiments described above. On the contrary, many modifications and variations are possible within the scope of the appended claims. For example, in the embodiment shown in FIGS. 1 and 2 and 3a, the gap 32 is relatively small, but if the gap is wider when no force is applied to the flexible connections, the flexible connections may (also) be compressed allowing the pitch of the lens elements to be decreased.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lens plate for an LED device, the lens plate comprising:
   a plurality of lens elements each having an optical axis, said plurality of lens elements being arranged in a plane perpendicular to the optical axes; and
   a flexible connection between a further plurality of two consecutive lens elements of the plurality of lens elements so that a distance and an angle between each of said two lens elements can be adjusted in said plane, and the flexible connection comprising two V-shaped members such that a pitch of said two lens elements is increasable by up to 40%, each of the V-shaped members having first and second arms joined together at a pointed end of each arm to form the V-shape, and each of the V-shaped members being joined between the further plurality of two consecutive lens elements only at a flared end of a corresponding first or second arm, each of the flared ends being opposite the corresponding pointed end on the corresponding first or second arm of each of the V-shaped members;
   wherein each of said two lens elements and the flexible connection are made of the same material, and the flexible connection is molded together with the two lens elements.

2. A lens plate according to claim 1, wherein the flexibility of the flexible connection is achieved by at least one of the shape, dimension, and position of the flexible connection.

3. A lens plate according to claim 1, wherein the two lens elements each has a base portion, wherein the two base portions at least partly define two triangular- or isosceles trapezoid-shaped spaces pointing towards each other between the two base portions, and wherein each of the two triangular- or isosceles trapezoid-shaped spaces accommodates one of the two V-shaped members of the flexible connection.

4. A lens plate according to claim 1, wherein a gap exists between the two lens elements when no force is applied to the flexible connection.

5. A lens plate according to claim 1, wherein each lens element of the plurality of lens elements includes two protrusions adapted to engage with corresponding notches in an LED board of the LED device for positioning of the lens plate on the LED board.

6. A lens plate according to claim 1, wherein the plurality of lens elements are arranged in a linear array.

7. A lens plate according to claim 6, wherein the linear array is curved in a plane perpendicular to the plurality of lens elements' optical axes.

8. An LED device, comprising:
   a board with a plurality of LED light sources; and
   a lens plate according to claim 1, wherein a pitch of the plurality of lens elements of the lens plate matches a pitch of the plurality of LED light sources of the board.

9. An LED device according to claim 8, wherein each lens element of the plurality of lens elements includes two protrusions engaging with corresponding notches in the board for positioning of the lens plate on the board.

\* \* \* \* \*